(12) United States Patent
Maciocco et al.

(10) Patent No.: US 9,015,510 B2
(45) Date of Patent: Apr. 21, 2015

(54) OPTIMIZING ENERGY EFFICIENCY USING DEVICE IDLE DURATION INFORMATION AND LATENCY TOLERANCE BASED ON A PRE-WAKE CONFIGURATION OF A PLATFORM ASSOCIATED TO THE DEVICE

(75) Inventors: Christian Maciocco, Portland, OR (US); Ohad Falik, St. Kfar-Saba (IL); Ren Wang, Portland, OR (US); Nadav Shulman, Tel Mond (IL); Paul Diefenbaugh, Portland, OR (US); Tsung-Yuan Charles Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 266 days.

(21) Appl. No.: 13/537,260

(22) Filed: Jun. 29, 2012

(65) Prior Publication Data
US 2014/0006824 A1    Jan. 2, 2014

(51) Int. Cl.
*G06F 1/00*    (2006.01)
*G06F 1/32*    (2006.01)

(52) U.S. Cl.
CPC .................. *G06F 1/3203* (2013.01)

(58) Field of Classification Search
CPC .... G06F 1/3203; G06F 1/3215; G06F 1/3287
See application file for complete search history.

(56) References Cited

U.S. PATENT DOCUMENTS

| | | | |
|---|---|---|---|
| 7,930,564 B2 * | 4/2011 | Arai et al. ..................... | 713/300 |
| 2006/0288240 A1 | 12/2006 | Kardach et al. | |
| 2007/0234088 A1 * | 10/2007 | Marshall et al. .............. | 713/320 |
| 2007/0294554 A1 | 12/2007 | Kim | |
| 2008/0098245 A1 | 4/2008 | Hogan et al. | |
| 2009/0172434 A1 * | 7/2009 | Kwa et al. ..................... | 713/320 |
| 2009/0249103 A1 * | 10/2009 | Jeyaseelan et al. ........... | 713/324 |
| 2010/0169683 A1 * | 7/2010 | Wang et al. ................... | 713/323 |
| 2010/0169684 A1 * | 7/2010 | Jeyaseelan et al. ........... | 713/323 |
| 2010/0169685 A1 * | 7/2010 | Gough et al. ................. | 713/323 |
| 2011/0154080 A1 * | 6/2011 | Wang et al. ................... | 713/323 |
| 2011/0239302 A1 | 9/2011 | Choi | |
| 2013/0198540 A1 * | 8/2013 | Lee et al. ...................... | 713/320 |

FOREIGN PATENT DOCUMENTS

WO    2014/004388 A1    1/2014

OTHER PUBLICATIONS

International Search Report and Written Opinion received for PCT Patent Application No. PCT/US2013/047361, mailed on Oct. 10, 2013, 12 pages.

* cited by examiner

*Primary Examiner* — Jaweed A Abbaszadeh
*Assistant Examiner* — Gayathri Sampath
(74) *Attorney, Agent, or Firm* — Jordan IP Law, LLC

(57) ABSTRACT

Systems and methods may provide for aggregating a first idle duration from a first device associated with a platform and a second idle duration from a second device associated with the platform. Additionally, an idle state may be selected for the platform based at least in part on the first idle duration and the second idle duration. In one example, the idle durations are classified as deterministic, estimated or statistical.

25 Claims, 4 Drawing Sheets

OPTIMIZING ENERGY EFFICIENCY USING DEVICE IDLE DURATION INFORMATION AND LATENCY TOLERANCE BASED ON A PRE-WAKE CONFIGURATION OF A PLATFORM ASSOCIATED TO THE DEVICE

BACKGROUND

1.. Technical Field

Embodiments generally relate to power management in computing platforms. More particularly, embodiments relate to the use of device idle durations to select idle states for computing platforms.

2.. Discussion

In conventional mobile computing platforms, idle states may be used to reduce power consumption and extend battery life, wherein deeper idle states may generally conserve more power. Idle state depth may be limited, however, in order to guarantee the quality of service (QoS) that platform devices require. Unduly limiting idle state depth may have a negative impact on energy efficiency and performance in certain circumstances.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
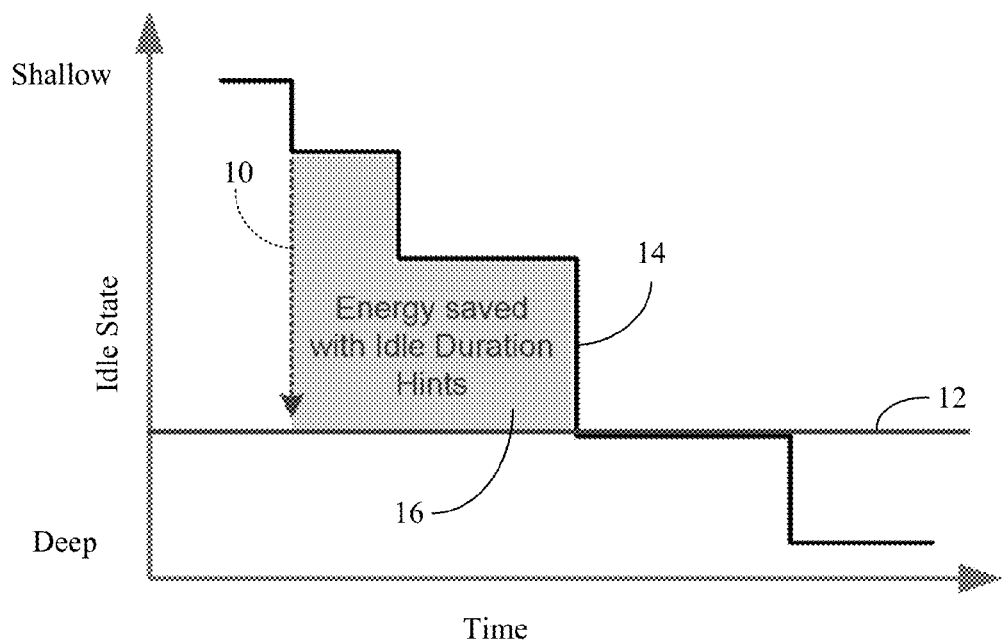
FIG. 1 is a plot of an example of idle state selections over time according to an embodiment.

Turning now to FIG. 1, an idle state selection plot is shown for a platform such as a computing device. The platform may have a platform latency tolerance requirement (LTR) 12, which can indicate the maximum acceptable delay in exiting an idle state selected for the platform to guarantee correctness. In this regard, transitioning out of a particular idle state is typically not instantaneous, wherein the platform LTR 12 may provide a mechanism of controlling the latency overhead associated with idle state transitions by determining which lower idle state can be reached to meet the exit latency requirements. As will be discussed in greater detail, the platform LTR 12 may be dependent upon the expected activity of the internal and external devices associated with the platform. In the illustrated example, idle duration information is aggregated from the devices associated with the platform, wherein idle duration information from a particular device may generally indicate the amount of time that the device is expected to remain idle.

More particularly, the idle duration information can be used to transition the platform more quickly into the deepest idle state that satisfies the platform LTR 12 along a state selection path 10. Indeed, the illustrated idle duration scheme would also be advantageous to platforms that do not have an LTR. Of particular note is that a conventional state selection path 14 that does not aggregate idle duration information from platform devices could result in the additional energy usage shown in a region 16 of the plot. In one example, the idle states are ACPI (Advanced Configuration and Power Interface, e.g., ACPI Specification, Rev. 4.0a, Apr. 5, 2010) low power states, although other types of idle states may also be used.

Figure 2:
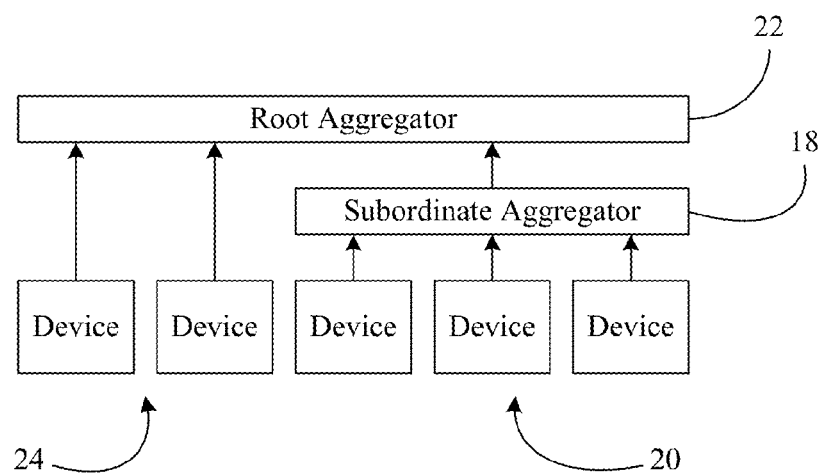
FIG. 2 is a block diagram of an example of an aggregator architecture according to an embodiment.

FIG. 2 shows an aggregator architecture in which a subordinate aggregator 18 collects idle duration information from a first set of devices 20, and a root aggregator 22 collects idle duration information from the subordinate aggregator 18 and a second set of devices 24. The first and second sets of devices 20, 24 may include a wide variety of internal and/or external platform devices such as, for example, timers, audio devices, displays, cameras, mice, keyboards, sensors, network devices, communication devices, and so forth. The idle duration information may be carried from the devices 20, 24 to the aggregators 18, 22 using, for example, specific bus primitives such as a PCIe (Peripheral Components Interconnect Express, e.g., PCI Express x16Graphics 150W-ATX Specification 1.0, PCI Special Interest Group) VDM (vendor defined message) or writes to specific memory addresses. Additionally, the aggregators 18, 22 can track the source of idle duration information via, for example, identifying the downstream port from which idle duration messages originate or using global enumeration schemes such as the source BDF (bus, device, function) information that is reported in PCIe messages.

Figure 3:
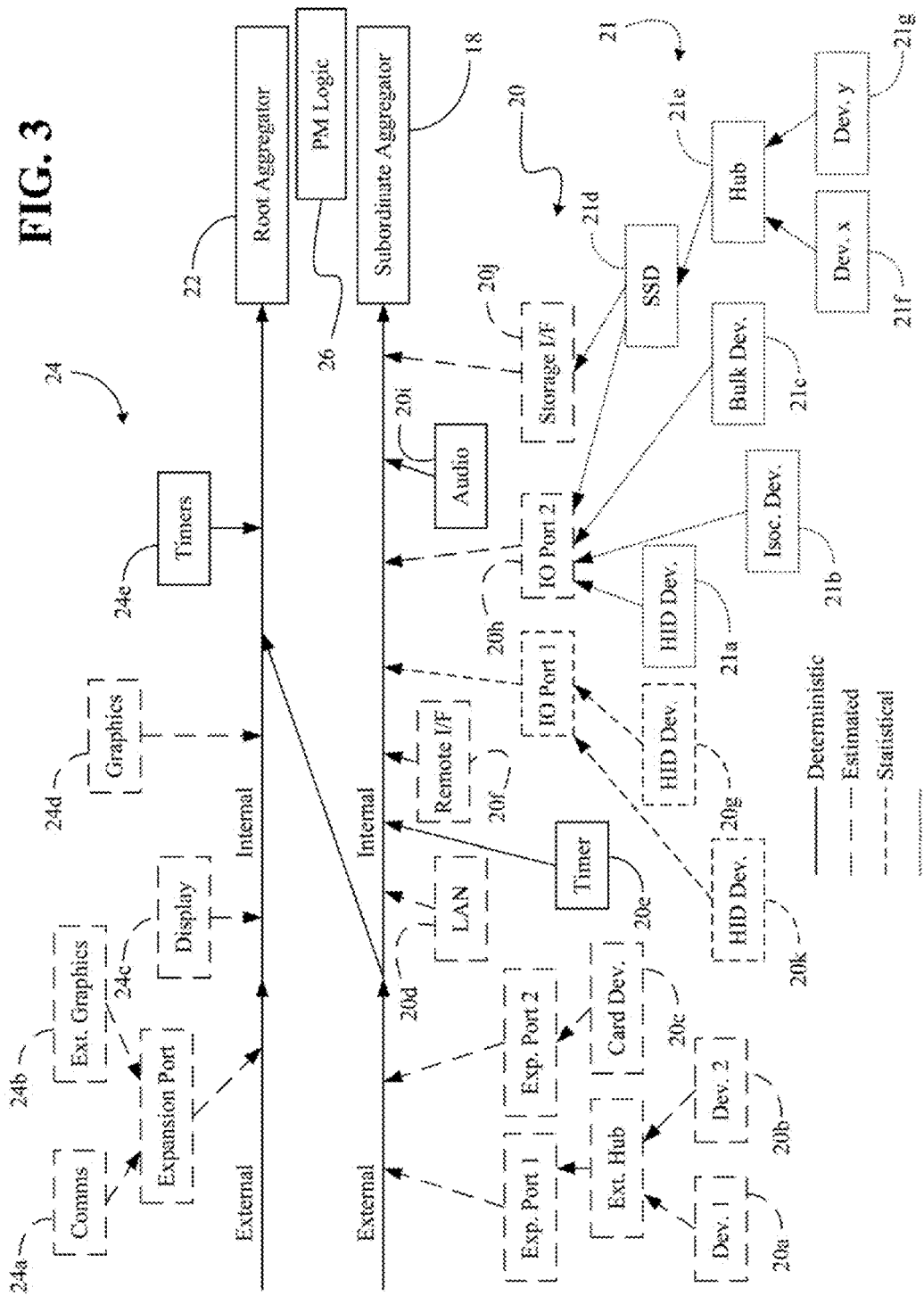
FIG. 3 is a block diagram of an example of a platform having an idle duration information reporting scheme according to an embodiment.

Turning now to FIG. 3 a platform is shown, wherein the platform may be part of a device having computing functionality (e.g., personal digital assistant/PDA, laptop, smart tablet), communications functionality (e.g., wireless smart phone), imaging functionality, media playing functionality (e.g., smart television/TV), or any combination thereof (e.g., mobile Internet device/MID). The illustrated platform includes a more detailed example of an idle duration reporting scheme in which the first set of devices 20 (20a-20k) report idle duration information to the subordinate aggregator 18, and the second set of devices 24 (24a-24e) report idle duration information to the root aggregator 22. In one example, the root aggregator 22 executes on a processor such as central processing unit (CPU) of the platform, and the subordinate aggregator 18 executes on an input/output (IO) subsystem of the platform, wherein the idle durations (e.g., idle duration information) from the devices 20, 24 may be classified by the aggregators 18, 22 as deterministic, estimated, or statistical.

In general, deterministic devices may be devices that are not expected to generate traffic for a specified period and are known to wake and begin conducting activity when the specified period ends. Such a device may generate traffic before the specified period ends, in which case the device in question may expect such traffic to be serviced according to a maximum latency (e.g., LTR) requested by the device. The LTR may therefore establish a QoS "floor" for each deterministic device. Delayed servicing, however, may be relatively infrequent (e.g., an exception to normal operation) in many circumstances. As will be discussed in greater detail, the deterministic deices can also report idle durations, wherein in one example, the deterministic idle durations are reported as a period of time from the time a message was last sent by the device.

Thus, the illustrated subordinate aggregator 18 receives deterministic idle durations and LTR information from internal devices such as a timer 20e. (e.g., high performance timer/HPET) and an audio device 20i. (e.g., audio direct memory access/DMA controller), and the illustrated root aggregator 22 receives deterministic idle durations from internal devices such as one or more timers 24e. (e.g., local advanced programmable interrupt controller/LAPIC timers). Deterministic idle durations may also be received from external devices such as displays, cameras, and so forth.

In one example, the subordinate aggregator 18 maintains a deterministic counter for each of the timer 20e and the audio device 20i, wherein the deterministic counters decrement (e.g., count down) from the reported deterministic idle durations and the subordinate aggregator 18 selects the minimum deterministic counter value as a deterministic idle duration to be reported to the root aggregator 22 when it is later queried by the root aggregator 22 or decides to push the information to root aggregator 22. Similarly, the root aggregator 22 may maintain a deterministic counter for the each of the timers 24e and the deterministic idle duration reported by the subordinate aggregator 18, and select the minimum deterministic counter value as a deterministic idle duration for the platform.

Figure 4:
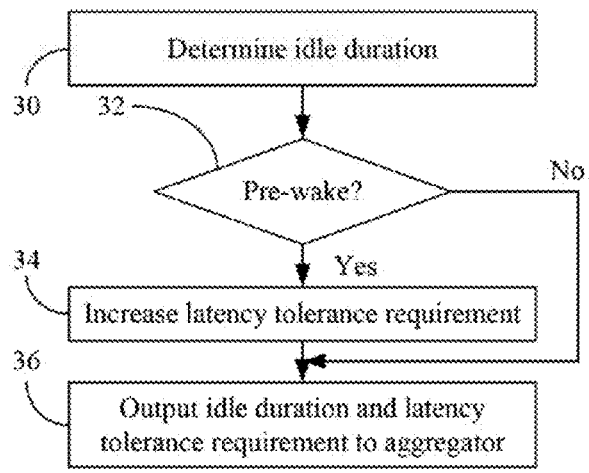
FIG. 4 is a flowchart of an example of a method of determining idle duration actions according to an embodiment.

FIG. 4 shows a method 28 of determining idle duration actions. The method 28 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 30 determines an idle duration for the device. As already noted, the idle duration may be considered relative in time to a message sent by the device, wherein the device could plan to enter a sleep/idle state until a response to the message needs to be processed. A determination may be made at block 32 as to whether the platform is configured to conduct one or more pre-wake activities, wherein pre-wake activities might include, for example, power and/or clock related tasks that enable the platform to exit the idle state in gradual steps more efficiently and quicker. The determination at block 32 could be made, for example, by accessing an appropriate register or programmable memory location. If the platform is configured to conduct pre-wake activities, illustrated block 34 increases (e.g., lengthens) the LTR of the deterministic device. Increasing the LTR can permit more latency during exits from idle states and may effectively enable the platform to enter deeper idle states.

If the platform is not configured to conduct pre-wake activities, on the other hand, the LTR is left unchanged in the illustrated example. Block 36 can provide for outputting the idle duration and LTR to an aggregator such as the root aggregator 22 (FIGS. 2 and 3) or the subordinate aggregator 18 (FIGS. 2 and 3), as already discussed. As will be discussed in greater detail, the deterministic device may also report another, shorter, LTR to be used for "pop-ups" near the end of idle periods.

Estimated devices, on the other hand, may be devices in which there is a relatively high likelihood that the device will not generate traffic for a specified period of time, wherein the device might not have traffic when the specified period of time expires. Examples of such devices include, for example, network devices (e.g., extensible host controller interface/XHCI, wired/wireless devices) and other communication devices having buffers that fill up based on incoming traffic or scheduled windows of operation during which activity may occur. These devices may also report idle duration as a period of time from when a message was sent.

Thus, returning to FIG. 3, the illustrated subordinate aggregator 18 receives estimated idle durations from external devices such as expansion devices 20a, 20b that are coupled to an external bus via an expansion port ("Expansion Port 1") and an external hub ("Ex. Hub"), and from a card device 20c that is coupled to the external bus via an expansion port ("Expansion Port 2"). In one example, the expansion ports and external hub use a PCIe protocol to communicate with one another. The subordinate aggregator 18 may also receive estimated idle durations from internal devices such as a local area network (LAN) device 20d, a remote interface (I/F, e.g., management engine/ME interface) 20f, an input/output (IO) port 20h. (e.g., Universal Serial Bus/USB port), a storage I/F 20j. (e.g., Serial Advanced Technology Attachment/SATA interface), and so forth.

In the illustrated example, the platform also includes certain devices 21 (21a-21g) that do not report idle duration information (e.g., "no hint" devices). In such a case, one or more interfaces may be used to estimate idle durations based on the traffic pattern of communications with the devices 21. For example, the illustrated IO port 20h estimates the idle duration based on the traffic pattern of connected devices such as an HID (human interface device) device 21a(e.g., mouse, keyboard, sensor, etc.), an isochronous device 21b (e.g., audio, camera), a bulk device 21c (e.g., storage, printer), and an SSD (solid state disk) 21d.. More particularly, the traffic pattern of the isochronous device 21b could be closer to deterministic in nature, as when the next slot will happen may be known exactly. Idle durations for the bulk device 21c, on the other hand, might be estimated based on previous activity. The illustrated storage I/F 20j is also coupled to the SSD 21d, which may in turn be coupled to a hub 21e and one or more devices 21f, 21g, wherein the storage I/F 21j can estimate idle durations.

For example, the storage I/F 20j may know if there are any IO requests pending, in which case it might estimate the idle duration to be something like "soon <1ms". If, on the other hand, there are no IO requests pending, the storage I/F 21j may estimate the idle duration to be "long~at least 5ms". Other values and implementations may also be used, depending upon the circumstances. Moreover, the illustrated root aggregator 22 receives estimated idle durations from an external communications device 24a, an external graphics controller 24b, an integrated display 24c, and an internal graphics controller 24d.

In one example, the subordinate aggregator 18 maintains an estimated counter for each of the expansion devices 20a, 20b, card device 20c, LAN device 20d, remote I/F 20f, IO port 20h, and storage I/F 20j, wherein the estimated counters decrement from the reported estimated idle durations. The subordinate aggregator 18 may therefore identify the minimum estimated counter value as an estimated idle duration to be reported to the root aggregator 22. Similarly, the illustrated root aggregator 22 maintains an estimated counter for each of the external communications device 24a, external graphics controller 24b, integrated display 24c, and internal graphics controller 24d, and the estimated idle duration reported by the subordinate aggregator 18, and selects the minimum estimated counter value as an estimated idle duration for the platform.

Statistical devices may be devices having traffic patterns that are only quantifiable in terms of a specific average rate. Examples of such devices include, for example, mice, keyboards, sensors, and so forth. These devices may report idle duration as an expected period of time between events. Thus, the illustrated subordinate aggregator 18 also receives statistical idle durations from internal devices such as an HID device 20g and an HID device 20k via an IO port ("IO Port 1", e.g., USB port). In one example, the subordinate aggregator 18 maintains a statistical counter for each of the HID devices 20g, 20k, wherein the statistical counters decrement from the reported statistical idle durations. The subordinate aggregator 18 may therefore identify the minimum statistical counter value as a statistical idle duration to be reported to the root aggregator 22.

If the minimum statistical counter value has multiple values close to it, a compensation approach may be used in which a shorter duration is assumed because the probability that one of the events will occur increases. Thus, the illustrated subordinate aggregator 18 could reduce the statistical idle duration and/or the platform idle duration if the idle duration from the HID device 20g and the idle duration from the HID device 20k are within a predetermined range of one another. The platform may also include platform management logic 26 that selects idle states for the platform based on the idle duration information from the aggregators 18, 22.

Figure 5:
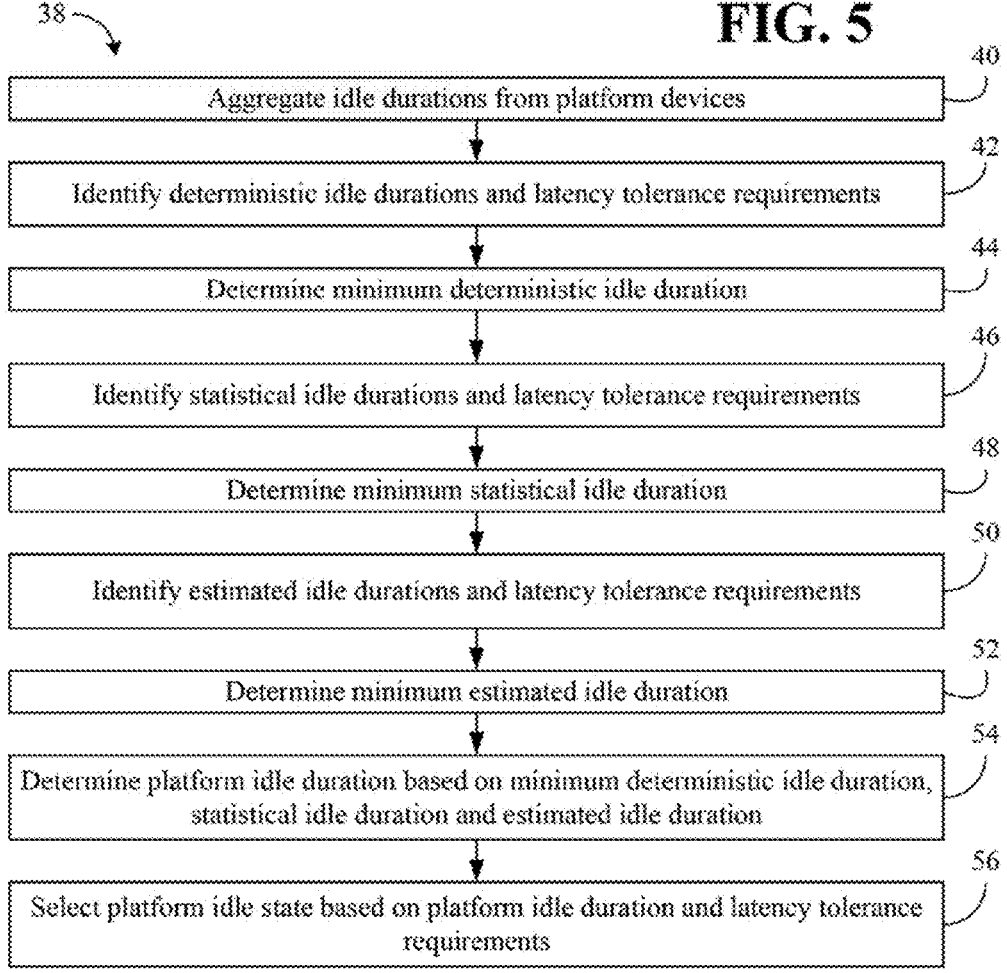
FIG. 5 is a flowchart of an example of a method of managing platform idle states according to an embodiment.

In particular, FIG. 5 shows a method 38 of managing platform idle states. The method 38 may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 40 aggregates idle durations from platform devices, wherein one or more deterministic idle durations and latency tolerances may be identified at block 42. Block 44 may provide for determining a minimum deterministic idle duration among the deterministic idle durations. Additionally, one or more statistical idle durations and latency requirements can be identified at block 46, wherein illustrated block 48 determines a minimum statistical idle duration among the statistical idle durations. Block 50 may identify one or more estimated idle durations and latency tolerances, and illustrated block 52 determines a minimum estimated idle duration among the estimated idle durations. In addition, a platform idle duration may be determined at block 54 based on the minimum deterministic idle duration, the minimum statistical idle duration, and the minimum estimated idle duration. In one example, the minimum value of these minimums is used as the platform idle duration. A platform idle state may be selected at block 56 based on the platform idle duration and the latency tolerances.

For example, the device corresponding to the minimum value used for the platform idle duration might be identified using downstream port information, global enumeration schemes, etc., as already noted. Accordingly, the LTR of that device may also be identified and used as a platform LTR, such as the platform LTR 12 (FIG. 1), to select an idle state for the platform.

Figure 6:
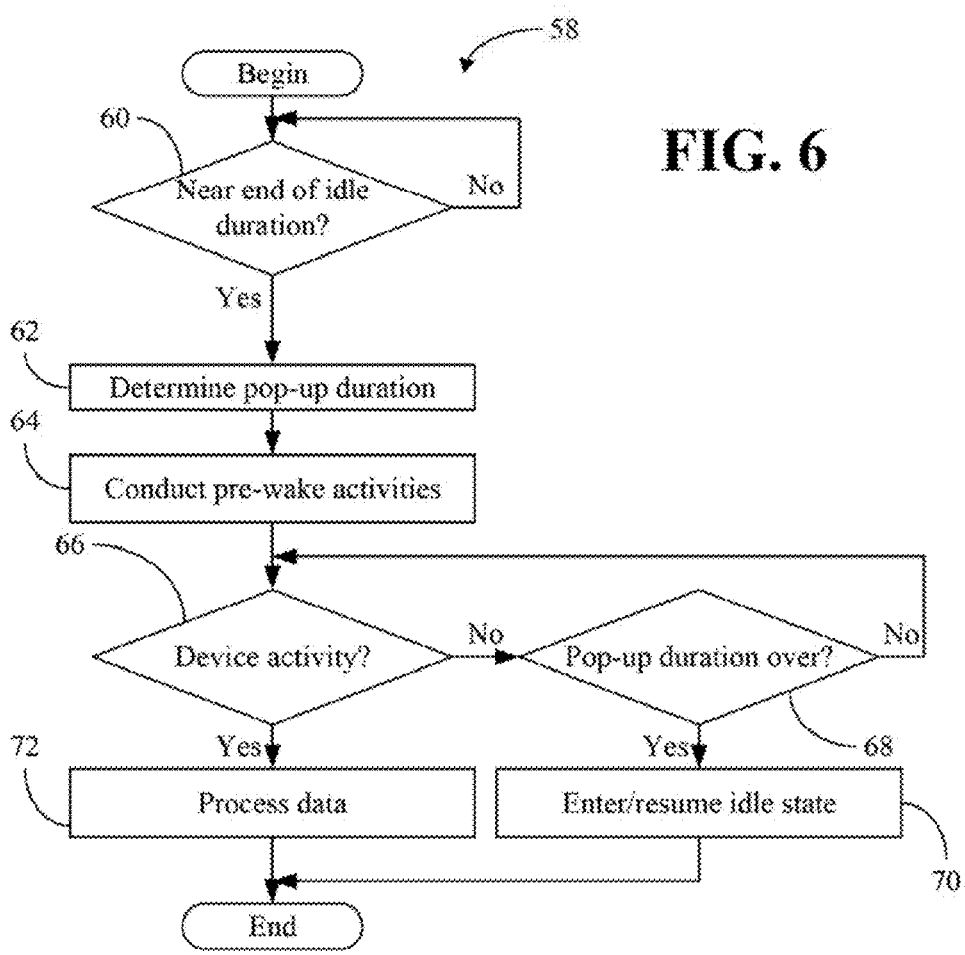
FIG. 6 is a flowchart of an example of a method of managing platform idle states near the end of an idle duration according to an embodiment.

Turning now to FIG. 6, a method 58 of managing platform idle states near the end of an idle duration is shown. The method 58 may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof. Illustrated processing block 60 determines whether an idle platform is near the end of the platform idle duration. If so, a "pop-up duration" may be determined at block 62 based on a relatively short latency tolerance. In this regard, a process may be used to briefly exit the platform from the idle state and determine whether the same or a deeper idle state is achievable. Thus, the process could be considered a "pop-up process" that takes place over a period of time that may be referred to as a "pop-up duration" or window (e.g., temporary "wake duration").

Moreover, when the platform idle duration is associated with a deterministic device, the illustrated approach determines the length of the pop-up duration based on a relatively short LTR in the example shown, in order to ensure/guarantee proper servicing of deterministic device traffic (because deterministic devices can report longer LTRs when the platform is configured for pre-wake operation). The shorter LTR may therefore be stored to a deterministic guaranteed LTR register that defines the responsiveness of the platform at the end of a deterministic idle duration, wherein the shorter LTR can be guaranteed for the pop-up duration.

Thus, illustrated block 64 conducts one or more pre-wake activities, wherein a determination can be made at block 66 as to whether the deterministic device (e.g., associated with the platform idle duration) has generated any traffic. Thus, block 66 may involve monitoring the device associated with the platform idle duration for activity for a period of time equal to the pop-up duration. If no such activity has occurred, block 68 determines whether the pop-up duration has expired. If the pop-up duration has not expired the illustrated loop checks again for device activity. When the pop-up duration expires without any device activity being detected, illustrated block 70 places the platform back into the same or a deeper idle state in order to further conserve energy and extend battery life. If device activity is detected at block 66, illustrated block 72 provides for processing the data/traffic associated with the device in question.

Figure 7:
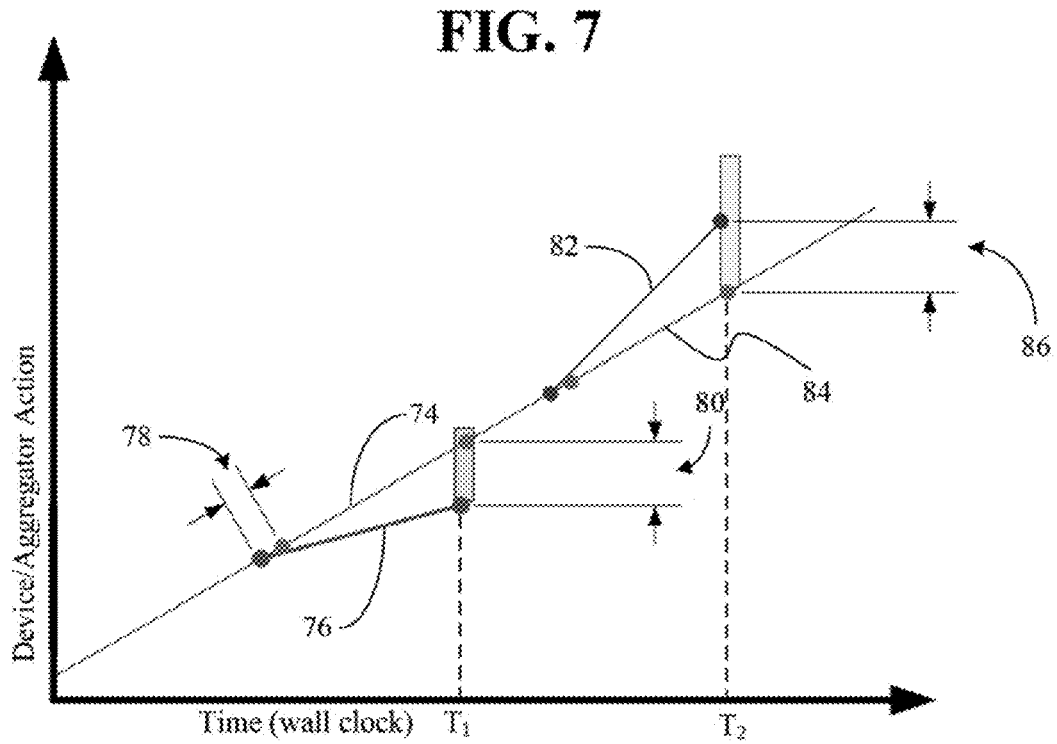
FIG. 7 is a plot of an example of a clock drift compensation scheme according to an embodiment.

In cases where the device and the aggregators do not use a common time base (e.g., clock), clock drift compensation may be used. In this regard, FIG. 7 shows a clock drift compensation scheme in which device/aggregator action is plotted against time. In the illustrated example, an idle message is transmitted from a first device to an aggregator, wherein the first device uses a clock that is slightly faster than the clock being used by the aggregator (e.g., negative drift). A device line segment 76 begins at the opening of an idle message propagation window 78 and an aggregator line segment 74 begins at the closing of the idle message propagation window 78. Thus, the device line segment 76 represents the time period during which the first device is in the idle state, and the aggregator line segment 74 represents the time period during which the aggregator is in the idle state, in the example shown. At time $T_1$, the idle duration expires. Because the first device has a clock that is ahead of the clock being used by the aggregator, however, the first device wakes before the aggregator. In order to ensure that messages from the first device to the aggregator are not lost, the illustrated approach creates a device wait window 80 during which the device waits for the aggregator to exit the idle state.

Similarly, the aggregator could use a clock that is slightly faster than the clock being used by a second device (e.g., positive drift). For example, an aggregator line segment 84 and a device line segment 82 for the second device might exit an idle state at time $T_2$, wherein the clock drift (e.g., skew) causes the aggregator to actually wake before the second device. Accordingly, the illustrated approach implements an aggregator wait window 86 in order to prevent the aggregator from incorrectly assuming that the second device has no data/traffic to be processed. In one example, the device wait window 80 and the aggregator wait window 86 may be implemented by compensating the platform idle duration and/or the pre-wake activity for clock drift. For example, a limit may be placed on the platform idle duration so that the clock drift during the idle duration will be shorter than the pop-up duration. Additionally, pre-wake activities can be scheduled to occur before the device wakes, taking into account maximum negative drift. For example, the pre-wake activities may be scheduled to occur before the end of the device line segment 76, in the example shown.

Embodiments may therefore include a deterministic device having logic to determine an idle duration for the device, and determine a latency tolerance based on a pre-wake configuration of a platform associated with the device. The logic may also output the idle duration and the latency tolerance. In one example, the logic increases the latency tolerance if the platform is configured to conduct one or more pre-wake activities.

Embodiments may also include an apparatus having first aggregator logic to aggregate a first idle duration from a first device and a second idle duration from a second device. Additionally, the apparatus may have power management logic to select an idle state for the platform based at least in part on the first idle duration and the second idle duration.

Embodiments can also include a platform having a first device to output a first idle duration, a second device to output a second idle duration, and root aggregator logic to aggregate the first idle duration and the second idle duration. The platform may also have power management logic to select an idle state for the platform based at least in part on the first idle duration and the second idle duration.

Other embodiments may include at least one machine readable storage medium having a set of instructions which, if executed by at least one processor, cause a platform to aggregate a first idle duration from a first device associated with the platform and a second idle duration from a second device associated with the platform. The instructions, if executed, can further cause the platform to select an idle state for the platform based at least in part on the first idle duration and the second idle duration.

Additionally, embodiments may include a method in which a first idle duration associated with a platform is aggregated with a second idle duration from a second device associated with the platform. The method can also provide for selecting an idle state for the platform based at least in part on the first idle duration and the second idle duration.

Techniques described herein may therefore use knowledge of upcoming deterministic periods of idleness in platform devices such as display devices, audio devices, timers, camera pipelines, etc., to enable processing components to pre-wake, reduce latency and optimize wake energy. Moreover, knowledge of upcoming estimated periods of idleness in platform devices such as communication devices, network devices, etc., can enable processing components to select the most appropriate idle state given the idle duration period and the energy break-even time of the specific state. Simply put, idle duration reporting and aggregation can add determinism to the idle state decision process, which may in turn enable the optimal energy efficiency state to be reached as soon as possible as well as enable residency in this state to be optimized.

In addition, techniques described herein may be scalable, covering both internal and external devices while remaining topology independent. Accordingly, architectures such as laptops, notebooks, ultrabooks, smart phones, etc., may readily benefit from these solutions. Moreover, the data collection schemes described herein can particularly enhance operation in the presence of deep sleep states with relatively long exit times and energy break even times.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated. Moreover, any use of the terms "first", "second", etc., does not limit the embodiments discussed to the number of components listed.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus comprising:
   first aggregator logic to aggregate a first idle duration from a first device and a second idle duration from a second device, wherein the first aggregator logic is to,
      identify the first idle duration and the second idle duration as deterministic idle durations, and
      determine a platform idle duration based at least in part on the deterministic idle durations, wherein the idle state is to be selected based at least in part on the platform idle duration; and
   power management logic to select an idle state for the platform based at least in part on the first idle duration and the second idle duration,
   wherein the first aggregator logic is to determine a first latency tolerance associated with the platform idle duration, and the power management logic is to conduct a pre-wake activity prior to an expiration of the platform idle duration.

2. The apparatus of claim 1, further including a register to store a second latency tolerance, wherein the first aggregator logic is to,
   determine a wake duration for the platform based at least in part on the second latency tolerance, wherein the second latency tolerance is to be less than the first latency tolerance; and
   use the wake duration to monitor a device associated with the platform idle duration for activity.

3. The apparatus of claim 1, wherein the power management logic is to compensate one or more of the platform idle duration and the pre-wake activity for clock drift.

4. The apparatus of claim 1, wherein the first aggregator logic is to,
   identify the first idle duration and the second idle duration as statistical idle durations, and
   determine a platform idle duration based at least in part on the statistical idle durations, wherein the idle state is to be selected based at least in part on the platform idle duration.

5. The apparatus of claim 4, wherein the first aggregator logic is to reduce the platform idle duration if the first idle duration and the second idle duration are within a predetermined range of one another.

6. The apparatus of claim 1, wherein the first aggregator logic is to,
   identify the first idle duration and the second idle duration as estimated idle durations, and
   determine a platform idle duration based at least in part on the estimated idle durations.

7. The apparatus of claim 1, further including second aggregator logic to output a plurality of aggregated idle durations, wherein the first aggregator logic is to receive the plurality of aggregated idle durations, and wherein the idle state is to be selected further based on the plurality of aggregated idle durations.

8. A platform comprising:
   a first device to output a first idle duration;
   a second device to output a second idle duration;
   first aggregator logic to aggregate the first idle duration and the second idle duration, wherein the first aggregator logic is to,
      identify the first idle duration and the second idle duration as deterministic idle durations, and
      determine a platform idle duration based at least in part on the deterministic idle durations, wherein the idle state is to be selected based at least in part on the platform idle duration; and
   power management logic to select an idle state for the platform based at least in part on the first idle duration and the second idle duration,
   wherein the first aggregator logic is to determine a first latency tolerance associated with the platform idle duration, and the power management logic is to conduct a pre-wake activity prior to an expiration of the platform idle duration.

9. The platform of claim 8, further including a register to store a second latency tolerance, wherein the first aggregator logic is to,
   determine a wake duration for the platform based at least in part on the second latency tolerance, wherein the second latency tolerance is to be less than the first latency tolerance; and
   use the wake duration to monitor a device associated with the platform idle duration for activity.

10. The platform of claim 8, wherein the first and second devices include one or more of a timer, an audio device, a display and a camera.

11. The platform of claim 8, wherein the first aggregator logic is to,
    identify the first idle duration and the second idle duration as statistical idle durations, and
    determine a platform idle duration based at least in part on the statistical idle durations, wherein the idle state is to be selected based at least in part on the platform idle duration.

12. The platform of claim 11, wherein the first and second devices include one or more of a mouse, a keyboard and a sensor.

13. The platform of claim 8, wherein the first aggregator logic is to,
    identify the first idle duration and the second idle duration as estimated idle durations, and
    determine a platform idle duration based at least in part on the estimated idle durations.

14. The platform of claim 13, wherein the first and second devices include one or more of a network device and a communication device.

15. At least one non-transitory machine readable storage medium comprising a set of instructions which, if executed by at least one processor, cause a platform to:
    aggregate a first idle duration from a first device associated with the platform and a second idle duration from a second device associated with the platform;
    identify the first idle duration and the second idle duration as deterministic idle durations;
    determine a platform idle duration based at least in part on the deterministic idle durations, wherein the idle state is to be selected based at least in part on the platform idle duration;
    select an idle state for the platform based at least in part on the first idle duration and the second idle duration;
    determine a first latency tolerance associated with the platform idle duration; and
    conduct a pre-wake activity prior to an expiration of the platform idle duration.

16. The at least one non-transitory machine readable medium of claim 15, wherein the instructions, if executed, cause a platform to:
    determine a wake duration for the platform based at least in part on a second latency tolerance associated with the platform idle duration, wherein the second latency tolerance is to be less than the first latency tolerance; and
    use the wake duration to monitor a device associated with the platform idle duration for activity.

17. The at least one non-transitory machine readable medium of claim 15, wherein the instructions, if executed, cause a platform to compensate one or more of the platform idle duration and the pre-wake activity for clock drift.

18. The at least one non-transitory machine readable medium of claim 15, wherein the instructions, if executed, cause a platform to:
identify the first idle duration and the second idle duration as statistical idle durations; and
determine a platform idle duration based at least in part on the statistical idle durations, wherein the idle state is to be selected based at least in part on the platform idle duration.

19. The at least one non-transitory machine readable medium of claim 18, wherein the instructions, if executed, cause a platform to reduce the platform idle duration if the first idle duration and the second idle duration are within a predetermined range of one another.

20. The at least one non-transitory machine readable medium of claim 15, wherein the instructions, if executed, cause a platform to:
identify the first idle duration and the second idle duration as estimated idle durations; and
determine a platform idle duration based at least in part on the estimated idle durations.

21. The at least one non-transitory machine readable medium of claim 15, wherein the instructions, if executed, cause a platform to receive a plurality of aggregated idle durations from an aggregator associated with the platform, wherein the idle state is to be selected further based on the plurality of aggregated idle durations.

22. A method of managing platform idle states comprising:
aggregating a first idle duration from a first device associated with a platform and a second idle duration from a second device associated with the platform;
identifying the first idle duration and the second idle duration as deterministic idle durations;
determining a platform idle duration based at least in part on the deterministic idle durations, wherein the idle state is selected based at least in part on the platform idle duration;
selecting an idle state for the platform based at least in part on the first idle duration and the second idle duration,
determining a first latency tolerance associated with the platform idle duration; and
conducting a pre-wake activity prior to an expiration of the platform idle duration.

23. A device comprising:
logic to,
determine an idle duration for the device,
determine a latency tolerance based on a pre-wake configuration of a platform associated with the device, and
output the idle duration and the latency tolerance.

24. The device of claim 23, wherein the logic is to increase the latency tolerance if the platform is configured to conduct one or more pre-wake activities.

25. The device of claim 23, wherein the device includes one or more of a timer, an audio device, a display and a camera.

* * * * *